(12) United States Patent
Moriwaki et al.

(10) Patent No.: US 7,023,849 B2
(45) Date of Patent: Apr. 4, 2006

(54) PACKET SWITCHING APPARATUS, METHOD OF TRANSMITTING MULTICAST PACKET AT PACKET SWITCHING APPARATUS, AND SETUP METHOD OF PACKET SWITCHING APPARATUS

(75) Inventors: Norihiko Moriwaki, Kokubunji (JP); Takahiko Kozaki, Tokyo (JP); Masami Takahashi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 842 days.

(21) Appl. No.: 09/922,748

(22) Filed: Aug. 7, 2001

(65) Prior Publication Data

US 2003/0002506 A1 Jan. 2, 2003

(30) Foreign Application Priority Data

Jul. 2, 2001 (JP) ............................. 2001-200303

(51) Int. Cl.
*H04J 3/26* (2006.01)
*H04L 12/56* (2006.01)

(52) U.S. Cl. ...................... 370/390; 370/419; 370/432

(58) Field of Classification Search ................ 370/352, 370/388, 399, 438, 390, 419, 432; 709/238
See application file for complete search history.

(56) References Cited

U.S. PATENT DOCUMENTS

| 5,689,505 | A | * | 11/1997 | Chiussi et al. | 370/388 |
| 5,903,559 | A | * | 5/1999 | Acharya et al. | 370/355 |
| 6,052,373 | A | * | 4/2000 | Lau | 370/399 |
| 6,246,692 | B1 | * | 6/2001 | Dai et al. | 370/438 |
| 6,343,326 | B1 | * | 1/2002 | Acharya et al. | 709/238 |
| 6,484,209 | B1 | * | 11/2002 | Momirov | 709/238 |
| 6,594,268 | B1 | * | 7/2003 | Aukia et al. | 370/400 |
| 6,728,238 | B1 | * | 4/2004 | Long et al. | 370/352 |

FOREIGN PATENT DOCUMENTS

JP 05-235991 2/1992

\* cited by examiner

*Primary Examiner*—Alpus H. Hsu
(74) *Attorney, Agent, or Firm*—Reed Smith LLP; Stanley P. Fisher, Esq.; Juan Carlos A. Marquez, Esq.

(57) ABSTRACT

In a packet switching apparatus capable of multicast, the length of a bitmap added to a multicast packet is made variable, depending on the number of line interface cards housed in the packet switching apparatus.

3 Claims, 16 Drawing Sheets

EFFECT OF INTERNAL HEADER REDUCTION

| PORT NUMBERS I/F | INTERNAL PACKET LENGTH FOR 64 BYTE INPUT PACKET | | |
|---|---|---|---|
| | PRIOR ART (U/M) | PRESENT INVENTION (U) | PRESENT INVENTION (M) |
| 16 | 102 Bytes (1.59) | 71 Bytes (1.11) | 72 Bytes (1.13) |
| 64 | 102 Bytes (1.59) | 71 Bytes (1.11) | 78 Bytes (1.22) |
| 256 | 102 Bytes (1.59) | 71 Bytes (1.11) | 102 Bytes (1.59) |

☐ : INPUT PACKET   ■ : INTERNAL HEADER   U : UNICAST   M : MULTICAST

PACKET SWITCHING APPARATUS, METHOD OF TRANSMITTING MULTICAST PACKET AT PACKET SWITCHING APPARATUS, AND SETUP METHOD OF PACKET SWITCHING APPARATUS

BACKGROUND OF THE INVENTION

1. Field of the Invention

The present invention relates to a packet data switching apparatus that switches variable-length packets such as Internet Protocol (IP) packets.

2. Description of the Background

Recently, there has been a significant increase in data traffic including Internet data traffic. Also, there is a move to perform conventional voice communications and services such as transaction processing, which have been performed over leased lines, on the Internet for the purpose of cost reduction. To cope with this situation, high speed, large capacity, and scalable configuration are required for packet data switching apparatuses.

FIG. 21 shows the configuration of a general packet switching apparatus. A packet switching apparatus 1 comprises: plural ingress line cards 20; plural egress line cards 30; a packet switch 10 for connecting and switching input/output lines; and a controller 40 for controlling these functional blocks.

The ingress line cards 20 and the egress line cards 30 are, in some times, configured with physically identical modules.

Methods are available for scalably expanding such a packet switching apparatus so as to have larger capacity. As shown in FIG. 22, plural packet switching apparatuses 1 are mutually connected by a connection system 50 configured with large-capacity crossbar switches and the like. Alternatively, as shown in FIG. 23, packet switches are cascaded to obtain a large capacity and increase the number of user ports.

In future, in terms of applications, more demands are expected for services such as distant learning, tele-conference and contents distribution. To efficiently offer these services over a network, the packet switching apparatuses must have the multicast function.

A packet switching apparatus to support multicast is disclosed in JP-A-235991/1993 (hereinafter referred to as "reference 1"). An ATM-based multicast system disclosed by the reference 1 is shown in FIG. 24. In this system, a fixed-length packet (ATM cell) comprised of user information 100 and a cell header 101 containing ATM call identifier VPI/VCI is inputted to an switching system. When an ATM cell arrives at the switch, the destination information of the cell is retrieved from a header conversion table, using VPI/VPI 101 as key, and the destination information is added to the cell header. For a multicast cell, a bitmap tag 110 is added; for a unicast cell, a coded tag 112 is added. The bitmap tag refers to a method by which bits corresponding to all output destinations are provided and are set to "1" for desired output destinations (for example, when eight destinations exist, the destinations are displayed by 8 bits), and the coded tag refers to a method that represents an output destination by binary (for example, when eight destinations exist, the destinations are displayed by 3 bits). Each cell is added with a distribution indicator 120 to provide identification of multicast or unicast for the cell. Multicast cells are added with temporary VPI/VCI 111 and unicast cells are added with proper VPI/VCI 113. A multicast cell inputted to the switch are copied and outputted to plural output destinations according to the bitmap tag. In a following stage of the switch, a multicast cell is identified by the distribution indicator 120 and temporal VPI/VCI 111 of a multicast cell is replaced by proper VPI/VCI before it is sent to an output line.

SUMMARY OF THE INVENTION

ATM technology features cyclic hardware processing of data in units of fixed-length slots. In an ATM cell multicast system, an area of an internal cell header added to a fixed-length packet (cell) is fixedly allocated. For example, to support multicast in a large-capacity packet switching apparatus supporting 256 lines, a 256-bit bitmap area must be allocated in advance within a cell header. This means that, even if the system shown in the reference 1 is used, for unicast, 8 bits (256 destinations can be identified) are used for a coded tag and an area of other 248 bits (31 bytes) is an unused area. In other words, if a short packet of about 64 bytes is inputted to a variable-length packet switch, with multicast considered, a 256-bit (32-byte) bitmap is always added as a header. As a result of this, the 64-byte data will swell to 96-byte data, which is 1.5 times the size of the original data within the packet switching apparatus (in practice, an internal header for another usage will be added). Particularly for unicast, 31 bytes of the 96 bytes are transferred as an unused area, resulting in a wasteful use of switching resources of the packet switching apparatus.

Scalability is very important in large-capacity packet switching apparatuses. For example, as a possible implementation form, in edge portions of a network or at initial installation thereof, only a small number of unit nodes shown in FIG. 22 are used connected to a connection system 50, and when core portions of the network or traffic increases, unit nodes 1 are incrementally added to the connection system 50. In other words, in the above described large-capacity packet switching apparatus capable of supporting 256 lines, when only 16 lines are used, a bitmap necessary for multicast requires no more than 16 bits, so that the other 240 bits of the area provided for 256 lines are redundant. In short, in the case where a large-capacity packet switching apparatus is used in a small-scale configuration, since the whole of a multicast bitmap provided for a maximum configuration is transferred within the apparatus, switching resources within the apparatus become redundant.

According to one aspect of the present invention, in a packet switching apparatus capable of multicast, the length of a bitmap added to multicast packets is made variable depending on the number of line interface cards installed in the packet switching apparatus.

In one embodiment of the present invention, the number of installed line interface cards is entered from a management terminal connected to a packet switching apparatus.

Other aspects of the present invention will be made apparent in embodiments of the present invention.

BRIEF DESCRIPTION OF THE DRAWINGS

Preferred embodiments of the present invention will be described in detail based on the followings, wherein.

DETAILED DESCRIPTION OF THE INVENTION

First Embodiment

A description will be made of a first embodiment of a packet switching apparatus of the present invention.

Figure 1:
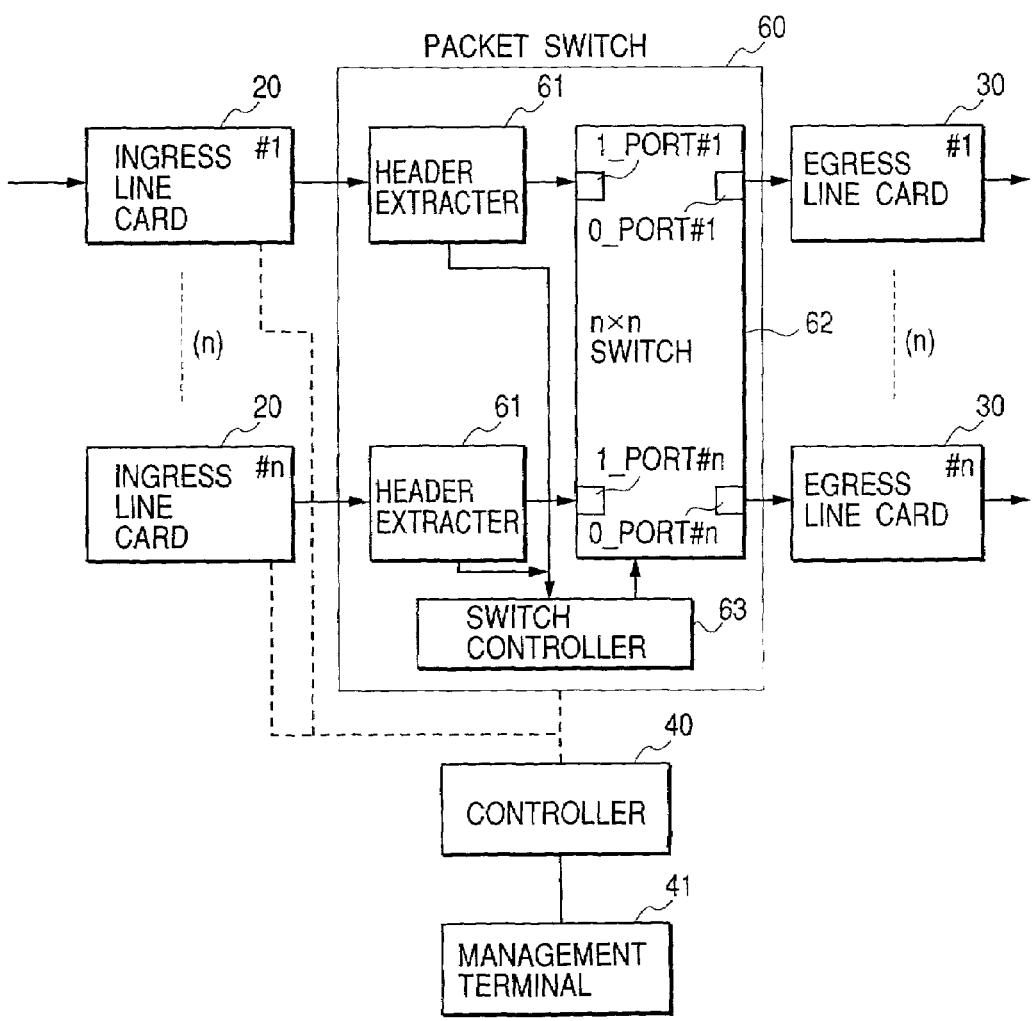
FIG. 1 is a block diagram showing the configuration of a packet switching apparatus of the present invention.

FIG. 1 shows an embodiment of a packet switching apparatus of the present invention. The packet switching apparatus comprises: plural ingress line cards 20; plural egress line cards 30; a variable-length packet switch 60 for switching among input and output lines; and a controller 40 controlling these functional blocks. An ingress line card #k is paired with an egress line card #k (k is an integer satisfying a relation of $1 \leq k \leq n$). The variable-length packet switch 60 comprises: plural header extracters 61, one for each of the ingress line cards; an n×n switch 62 having n input ports (I_PORT) and n output ports (O_PORT); and a switch controller 63. The n×n switch 62 may be configured so as to have an internal queue buffer for each output destination to provide against packet output collision; alternatively, the n×n switch may be made bufferless by controlling packet transmission from the line cards 20 to prevent collision of packet output to an identical switch output port by a controlling means such as the controller 40. I_PORT#k is paired with O_PORT#k (k is an integer satisfying a relation of $1 \leq k \leq n$). A packet outputted from an ingress line card #k is inputted to I_PORT#k, and a packet outputted from O_PORT#k is inputted to an egress line card #k. A management terminal 41 is connected to the controller 40. In the following description, pairs of the ingress line cards and the egress line cards may be simply referred to as line interface cards, and pairs of the input ports and the output ports as ports. A line interface card number of k denotes a pair of ingress line card #k and egress line card #k, and the line interface card number is the same as the number of an input port through which packets outputted from the ingress of the line interface card are inputted (or the number of an output port through which packets are outputted to an egress line card of the line interface card). Therefore, if, e.g., I_PORT#k is not used due to fault or for other reasons (in this case, O_PORT#k also is not used), the line interface card number k does not exist. A packet switching apparatus, although not shown, has n slots for accommodating n line interface cards. Packets outputted from an ingress line interface card of a line interface card accommodated in slot #k are inputted to I_PORT#k, and packets outputted from O_PORT#k are inputted to an egress line card #k of a line interface card accommodated in slot #k.

Figure 2:
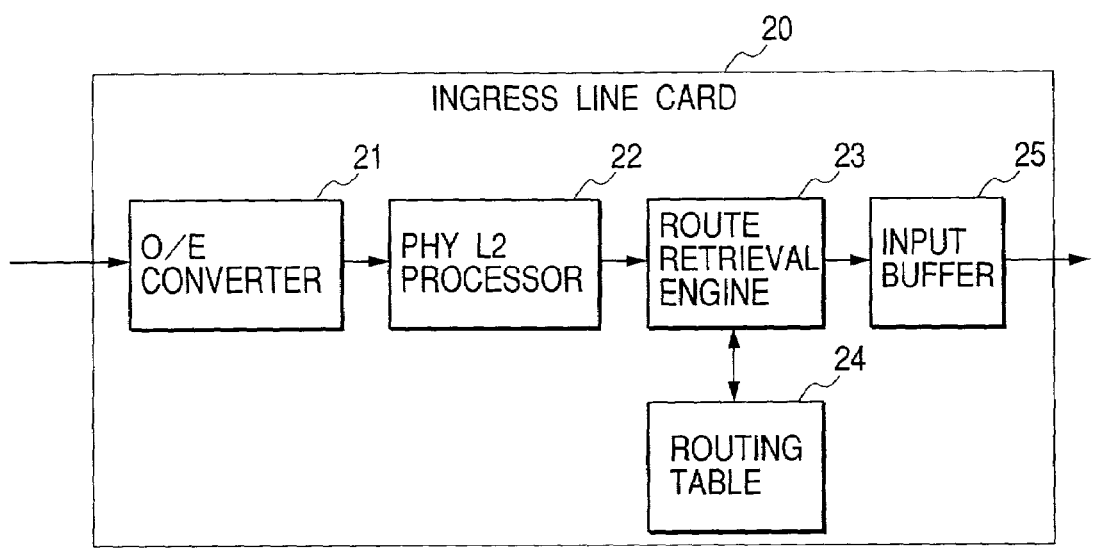
FIG. 2 is a block diagram showing a line interface card (ingress side) of the packet switching apparatus of the present invention.

FIG. 2 shows one embodiment of an ingress line card 20. The ingress line card 20 comprises: O/E converter 21; PHY L2 processor 22; route retrieval engine 23; routing table 24; and input buffer 25. After being inputted to the apparatus over an input line, packet data is converted from optical signal to an electrical signal in the O/E converter 21. Thereafter, in the PHY L2 processor 22, physical layer processing, packet extraction from a layer 2 frame, and error checking are performed. Thereafter, in the route retrieval engine 23, layer 3 processing such as output port retrieval and quality class retrieval are performed based on a destination IP address. Retrieval processing uses the routing table 24 connected to the route retrieval engine 23. The routing table 24 is configured in advance. In the routing table 24, each IP address has its related information such as output port information, quality class, and next hop IP address (NHIP). NHIP means the IP address of next transfer destination. Retrieval results are put in the header part of each packet. Packets outputted from the routing retrieval engine 23 are stored in the input buffer 25 and outputted to a variable-length packet switch after being subjected to queuing processing for each output destination and quality class control.

Figure 3:
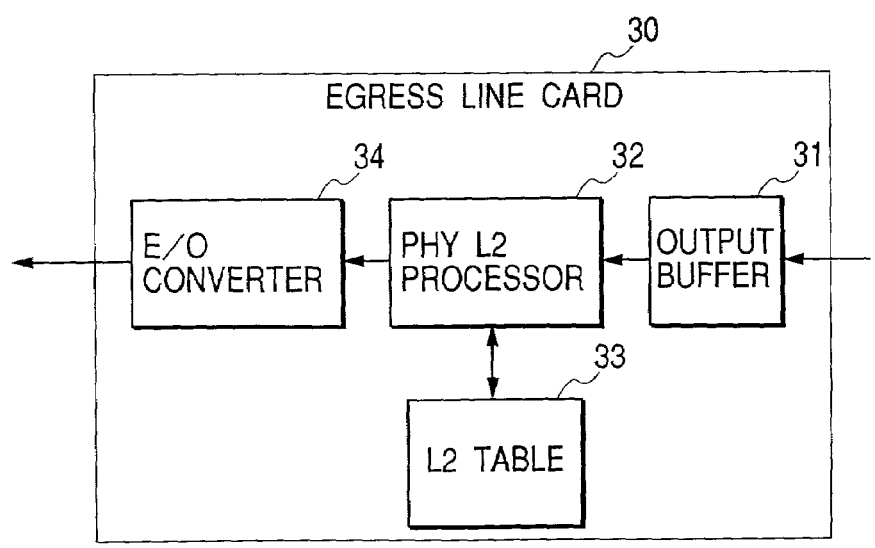
FIG. 3 is a block diagram showing the configuration of a line interface card (egress side) of the packet switching apparatus of the present invention.

FIG. 3 shows one embodiment of an egress line card 30. The egress line card 30 comprises: output buffer 31; PHY L2 processor 32; layer 2 table 33; routing table 24; and E/O converter 34. A packet outputted from the variable-length packet switch is stored in the output buffer 31 and subjected to quality class control. Next, in the PHY L2 processor 32, layer 2 processing is performed. For example, in the case where an output line is Ethernet, a layer 2 address (MAC address) of destination router is searched for and inserted, using a next hop IP address (NHIP). Correspondence between NHIP and layer 2 address of connection router is stored in the layer 2 table 33. Thereafter, the variable-length packet is subjected to layer 2 frame mapping processing and outputted to an output line after being converted to an optical signal in the E/O converter 34.

Figure 4:
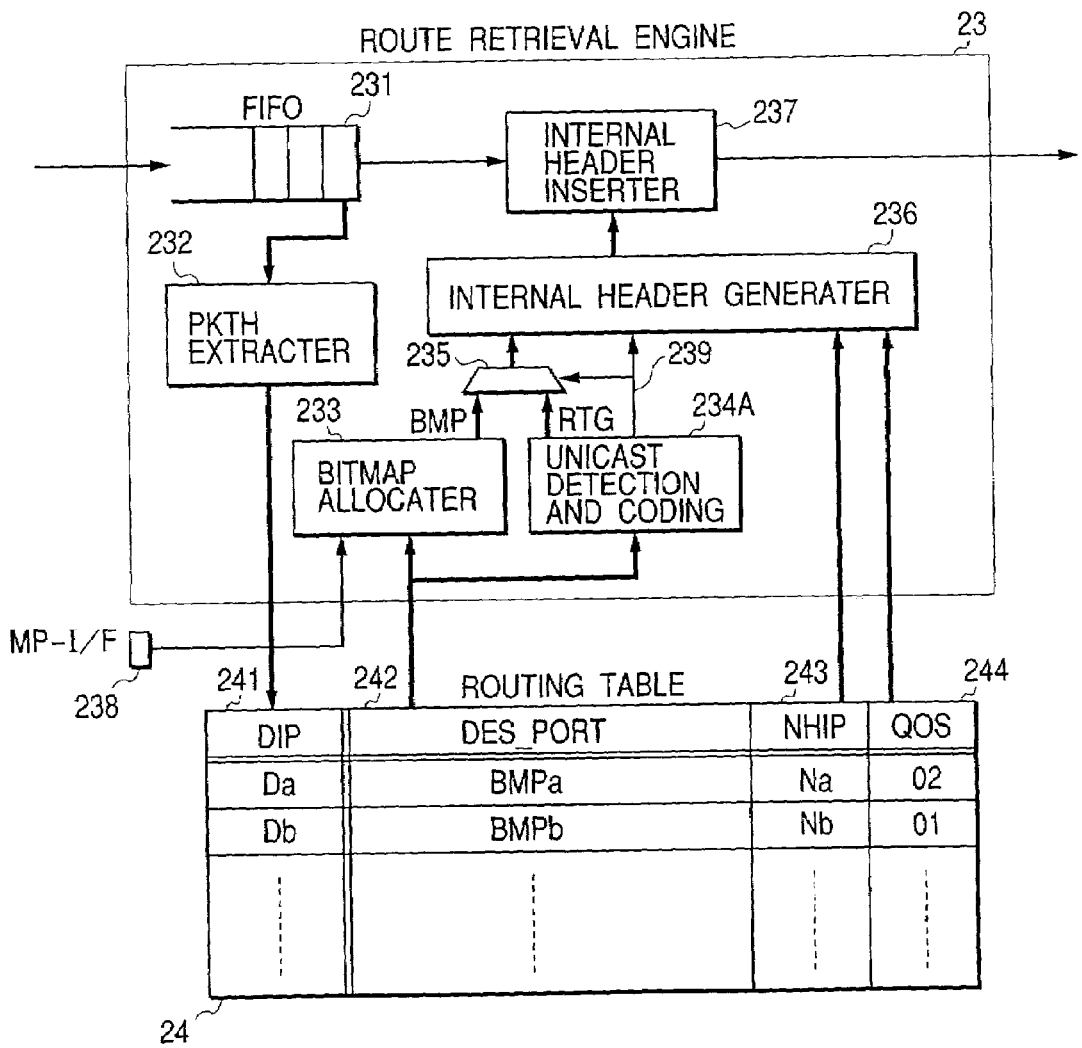
FIG. 4 is a block diagram showing functional blocks of the packet switching apparatus of the present invention.

FIG. 4 shows one embodiment of the route retrieval engine 23 installed in the ingress line card 20. The route retrieval engine 23 comprises: First In First Out (FIFO) queue buffer 231; packet header (PKTH) extracter 232; bitmap allocater 233; unicast detection and coding 234; selector 235; internal header generator 236; and internal header inserter 237. A packet inputted to the route retrieval engine 23 is stored in the FIFO queue buffer 231 and successively subjected to the following processing. From the packet at the head of the FIFO queue buffer 231, a packet header, concretely, a destination IP address (hereinafter referred to as DIP241) in the case of IP is fetched. DIP241 is sent to the routing table, and using its information as key, destination port information 242 indicating a desired egress line card 30, NHIP 243, and QOS information 244, which is a quality class identifier, are searched. The destination port information 242, which is bitmap information corresponding to a destination port, is sent to both the bitmap allocater 233 and the unicast detection and coding 234. NHIP 243 and QOS information 244 are sent to the internal header generater 236. The bitmap allocater 233 has a microprocessor connected to a microprocessor interface MP-I/F 238. In the bitmap allocater 233, a bitmap area specified by the microprocessor is cut out of the destination port information 242.

Figure 5:
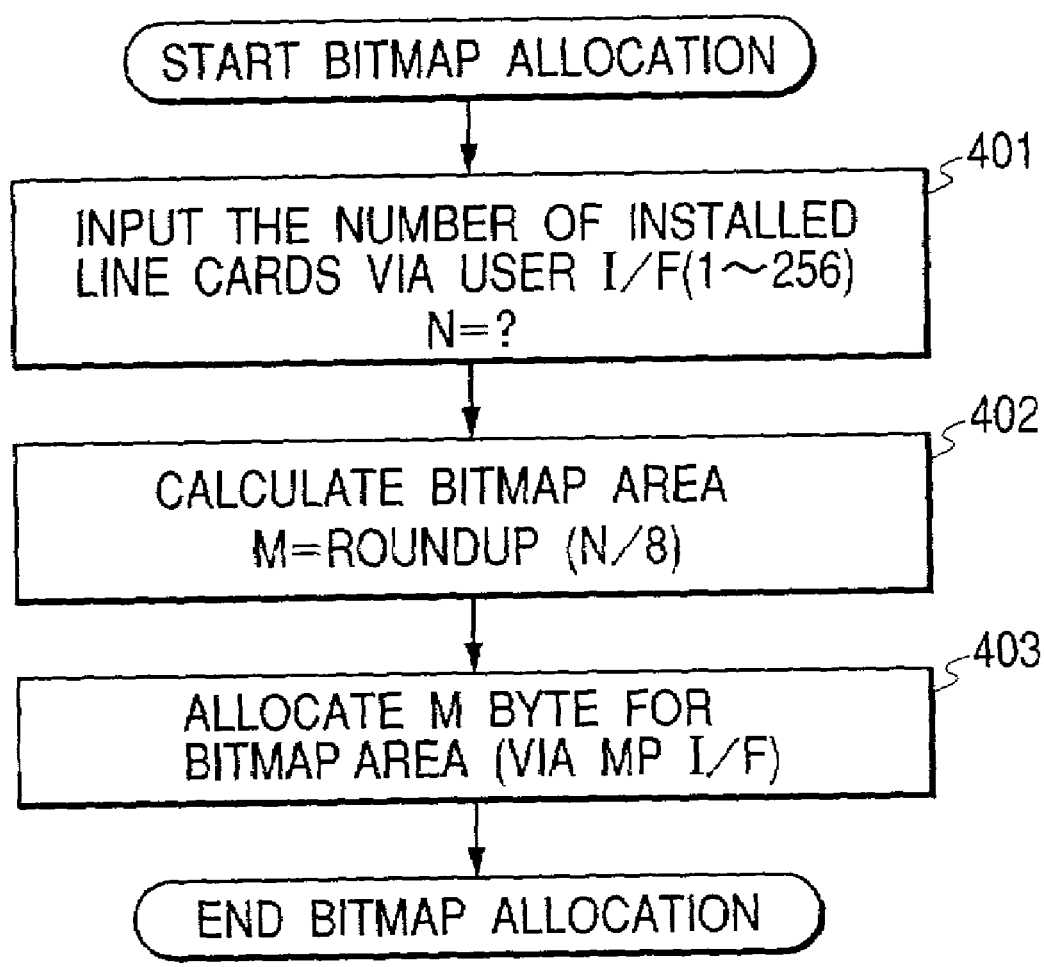
FIG. 5 is a flowchart showing a setup method of the packet switching apparatus of the present invention.

FIG. 5 shows an example of the procedure for allocating a bitmap area. A user, from a management terminal connected to a packet switching apparatus, enters the number of line interface cards installed in the packet switching apparatus (step 401). The number of line interface cards is rounded up in units of bytes and the length of a valid bitmap area is determined (step 402). These processing explained above are performed by the controller 40. Via MP-I/F 238, the valid bitmap area is set to the bitmap allocater 233 (step 403). The procedure for allocating a bitmap area is terminated by executing these steps. In the example of FIG. 5, the bitmap area is allocated in units of bytes (8 bits). This is because rounding up in units of bytes is more suitable for processing since serial data is supposed to be converted to 8-bit-wide parallel data for processing in the header extracter 61 in this example. The setting unit of bitmap may be arbitrary unit of length depending on the implementation. Although, in this embodiment, the processing of step 402 is performed in the controller 40 and a valid bitmap area is allocated to the bitmap allocater 233 via MP-I/F 238, the number of line interface cards entered from the management terminal may be directly sent to the microprocessor within the bitmap allocater 233 from the controller 40 so that the calculation in step 402 and the allocation of M bytes to the obtained bitmap area are performed by the microprocessor.

Figure 6:
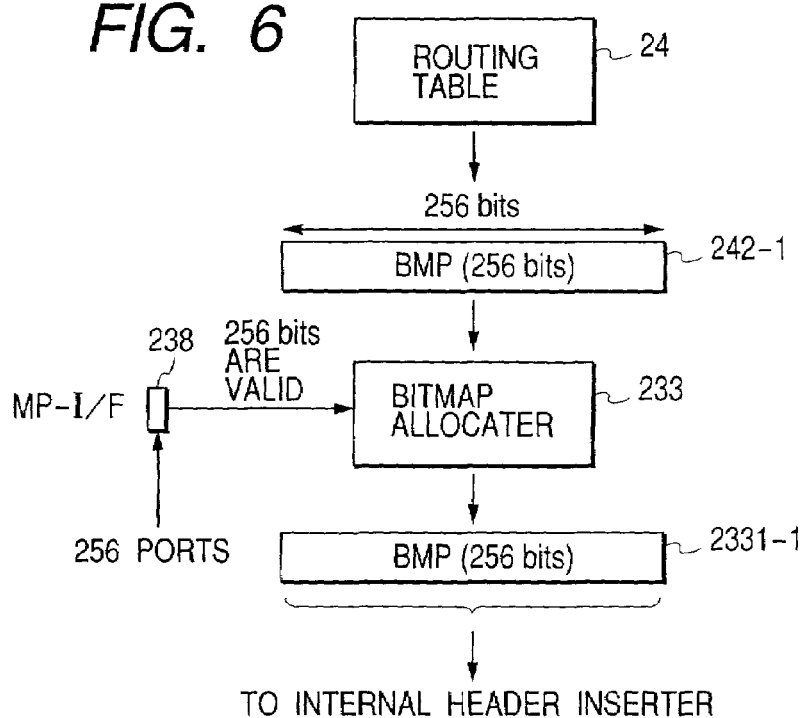
FIG. 6 is a processing example of the line interface card (ingress side) of the packet switching apparatus of the present invention.

FIG. 6 shows an example of processing of the bitmap allocater 233. If it is assumed that a maximum of 256 line interface cards can be installed in the packet switching apparatus, that is, a multicast of up to 256 destinations can be supported, bitmap information of 256 bits per entry is stored in the destination port information 242 of the routing table 24. In the case where this apparatus is used with a maximum configuration, directions are given to the bitmap allocater 233 from MP-I/F 238 so that all 256 bits of the destination port information 242 are valid. The bitmap allocater 233 sends bitmap 242-1 of 256 bits received from the routing table 24 to the selector 235 as BMP 2331-1 without modification.

Figure 7:
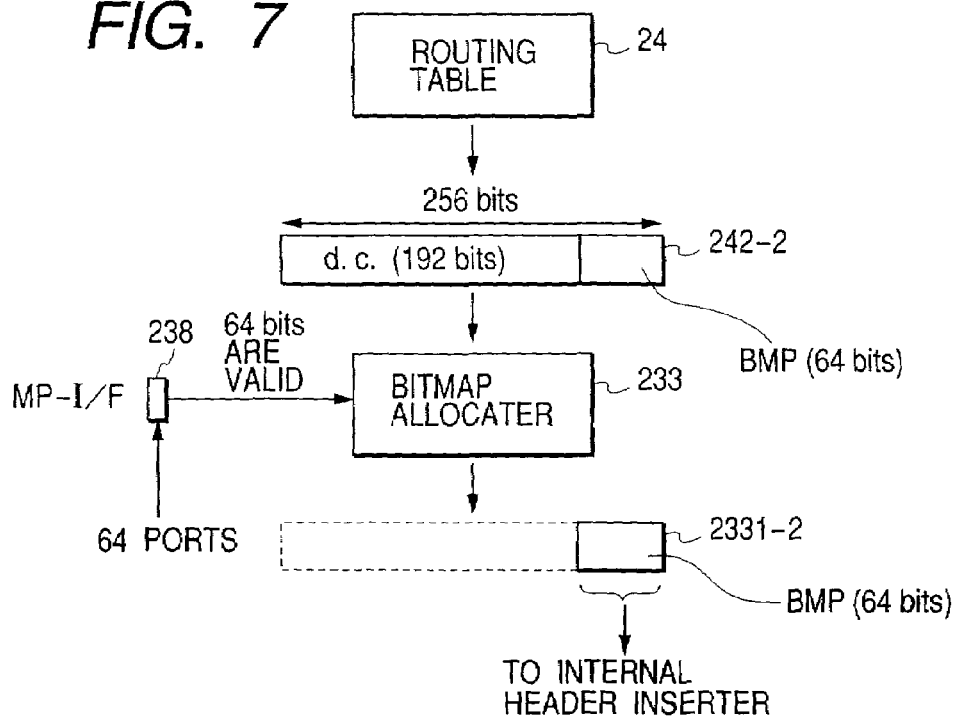
FIG. 7 is a processing example of the line interface card (ingress side) of the packet switching apparatus of the present invention.

FIG. 7 shows another example of processing of the bitmap allocater 233. In the case where 64 line interface cards are installed for use in slots #1 to 64 in the above described packet switching apparatus in which up to 256 line interface cards can be installed, directions are given to the bitmap allocater 233 from MP-I/F 238 so that only 64 bits of the destination port information 242 are valid. The bitmap allocater 233 isolates valid 64 bits from the bitmap 242-2 of 256 bits received from the routing table 24 and sends only valid bits to the selector 235 as BMP 2331-2.

Figure 8:
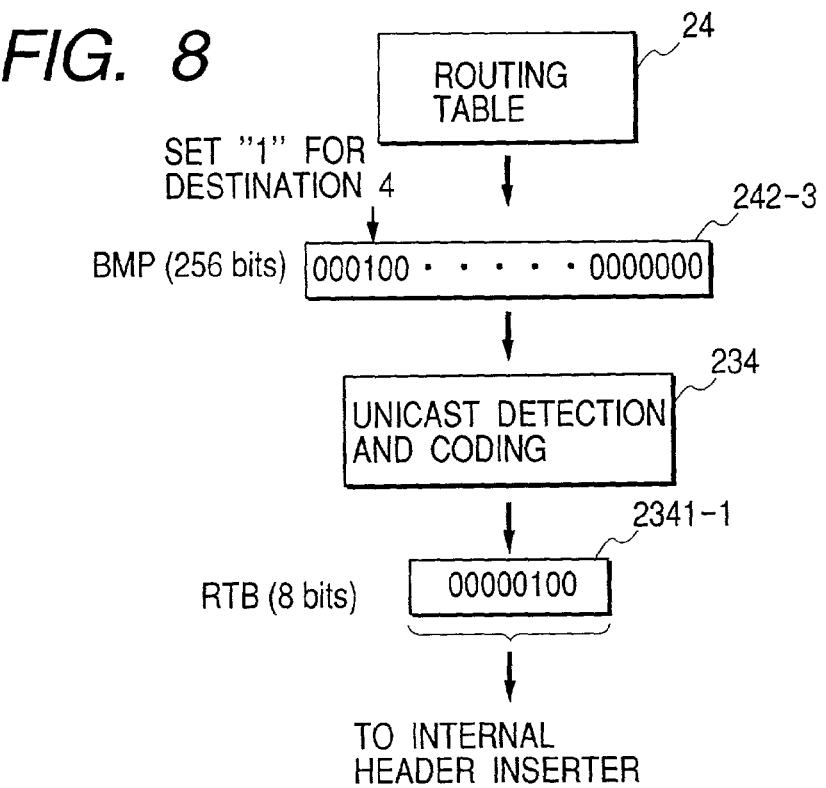
FIG. 8 is a processing example of the line interface card (ingress side) of the packet switching apparatus of the present invention.

The unicast detection and coding 234 analyzes a bitmap of the destination port information 242 to detect whether the number of desired destinations is one, which indicates unicast. In case of unicast, the bitmap information is coded into a binary value (routing tag, hereinafter referred to as RTG) which directly indicates a specified destination. An example of processing of the unicast detection and coding 234 will be described using FIG. 8. The unicast detection and coding 234 analyzes bitmap 242-3 of 256 bits received from the routing table 24, and on detecting that only one destination (destination 4 in this example) is an output target, which indicates unicast, the bitmap is coded into 8 bits of RTG 2341-1 ("00000100" indicating an output port #4 in this embodiment) and sends it to the selector 235.

Referring back to FIG. 4, BMP 2331 and RTG 2341 are inputted to the selector 235, which selects BMP 2331 or RTG 2341 so as to output BMP 2331 for multicast cells and RTG 2341 for unicast cells. The switching of the selector 235 is made according to an identifying signal 239 from the unicast detection and coding 234. The identifying signal 239 is also sent to the internal header generator 236. Unicast or multicast can also be judged by the type of DIP 241. An output signal of the selector 235 is sent to the internal header generator 236 and is inserted in a packet stored in the head of the FIFO queue buffer 231 along with NHIP 243 and QOS information 244 in the internal header inserter 237.

Figure 9:
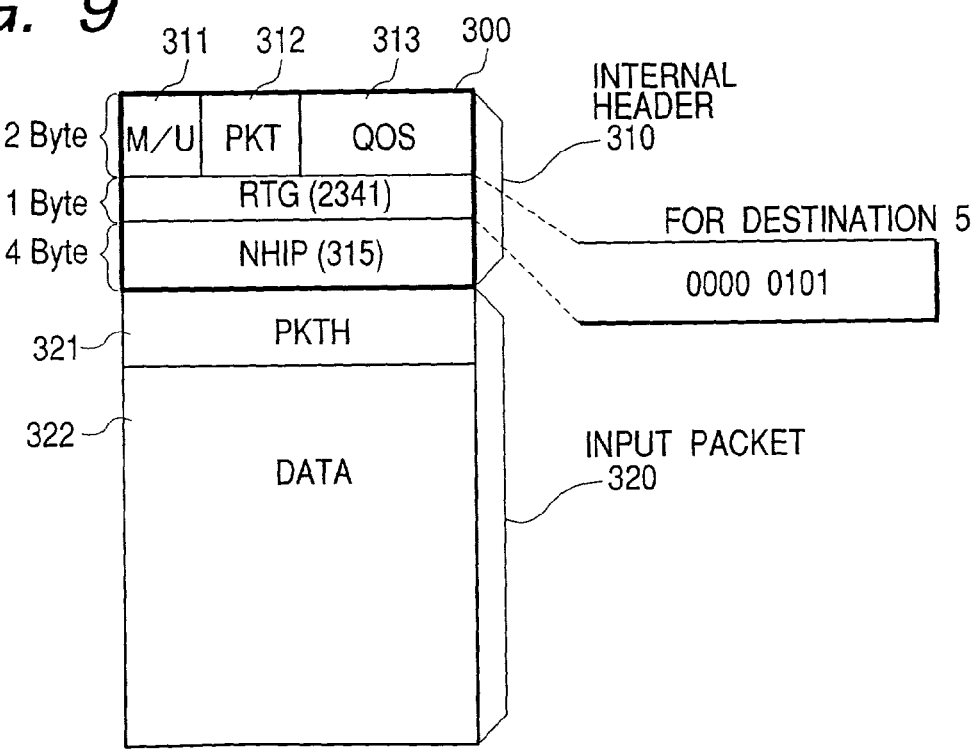
FIG. 9 is an example of a packet format used in the packet switching apparatus of the present invention.

Next, a description will be made of an example of a packet format used with the packet switching apparatus of the present invention. A format of unicast packet is shown in FIG. 9. A unicast packet 300 consists of an input packet part 320 from a line and an internal header 310. The input packet part 320 consists of a packet header (PKTH) 321 containing a destination IP address and other information, and variable-length data 322. The internal header 310 inserted by the internal header inserter 237 consists of multicast/unicast identifier (M/U) 311, packet type information (PKT) 312, quality class information (QOS) 313, routing tag (RTG) 2341, and NHIP 315. The RTG 2341 area consists of one byte (8 bits) so that it can identify 256 destinations. In this embodiment, a routing tag ("00000101") destined for output port #5 is shown.

Figure 10:
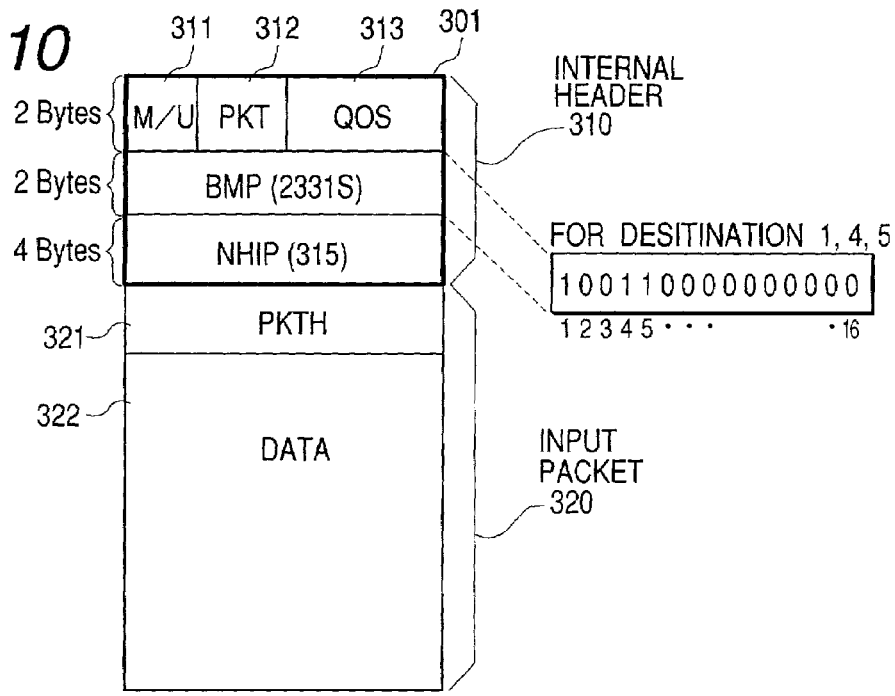
FIG. 10 is an example of a packet format used in the packet switching apparatus of the present invention.

FIG. 10 shows a format of multicast packet when a small number of line interface cards are installed in the apparatus. In the format of FIG. 10, in the interests of simplicity, the same portions as in FIG. 9 will be omitted from the following discussion and only different portions will be explained. In a multicast packet 301 shown in FIG. 10, the internal header 310 is provided with a 2-byte (16 bits) bitmap (BMP) 2331S so that 16 destinations can be identified. In this embodiment, a bitmap example of "1001100000000000" is shown. Since the first, fourth, and fifth bits from the start are set to "1", this packet is a multicast packet destined for output ports #1, #4, and #5.

Figure 11:
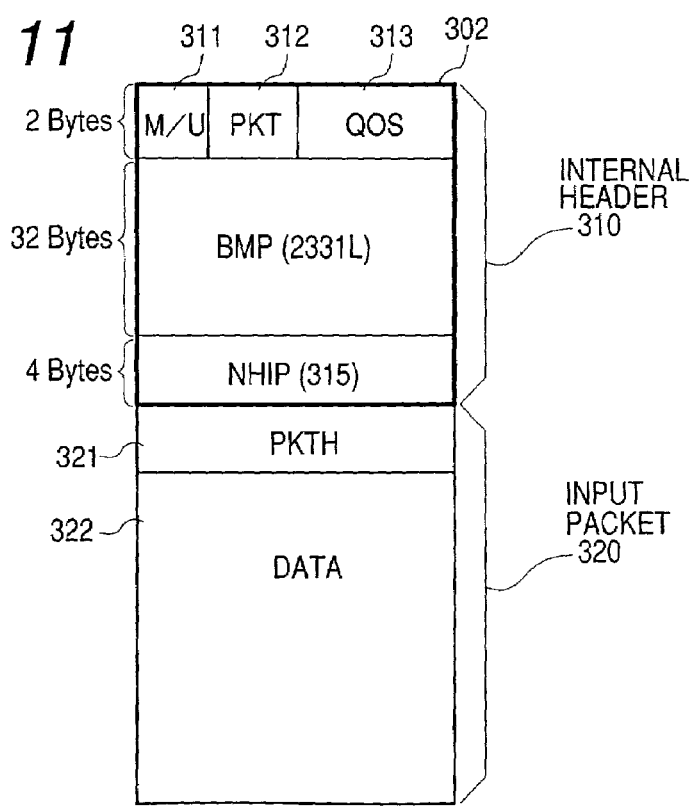
FIG. 11 is an example of a packet format used in the packet switching apparatus of the present invention.

FIG. 11 shows a format of multicast packet when a large number of line interface cards are installed in the apparatus. In a multicast packet 302 shown in FIG. 11, the internal header 310 is provided with a 32-byte (256 bits) bitmap (BMP) 2331L so that 256 destinations can be identified.

Using FIG. 12, the effects of redundant bit reduction in the apparatus of the present invention will be described. Hereinafter, an example when a 64-byte packet is inputted will be described. It is assumed that an internal header added to each packet includes 2 bytes of M/U 311, PKT 312, and QO 313, and 4 bytes of NHIP 315, and the maximum number of line interface cards installed in the apparatus, that is, a multicast support count is 256. In conventional systems in which the number of bytes of an internal header of unicast and multicast packets is fixed, since a 32-byte (256 bits) multicast bitmap area is added to all packets in all device configurations, packet length within the apparatus is 102 bytes. In other words, 1.59 times of bandwidth is used internally. In contrast, according to the present invention, since an internal header of unicast packets and multicast packets is optimized, for unicast packets, an 8-bit (1 byte) routing tag has only to be added so that 256 destinations can be identified. Consequently, regardless of apparatus configurations, packet length within the apparatus is 71 bytes, so that an increment of bandwidth is reduced to 1.11 times. For multicast packets, the length of an added bitmap area can be variable, whereby a 2-byte bitmap is added so that 16 destinations can be identified when 16 line interface cards are installed, and an 8-byte bitmap is added so that 64 destinations can be identified when 64 line interface cards are installed. Accordingly, it is understood that, in the case of small-scale configuration such as when 16 line interface cards are installed or 64 line interface cards are installed, increments of the internal bandwidth of multicast packets can be reduced to 1.13 times and 1.22 times, respectively. If the maximum number of line interface cards installed in the apparatus, that is, a multicast leaf count is greater, the effects of the present invention become greater.

Next, packet processing in the variable-length packet switch will be described. The variable-length packet switch 60 consists of a header extracter 61, n×n switch 62, and switch controller 63, as shown in FIG. 1. The internal header 310 of a variable-length packet inputted from an ingress line card 20 is sent to the switch controller 63 through header extractor 61.

Figures 12, 13:
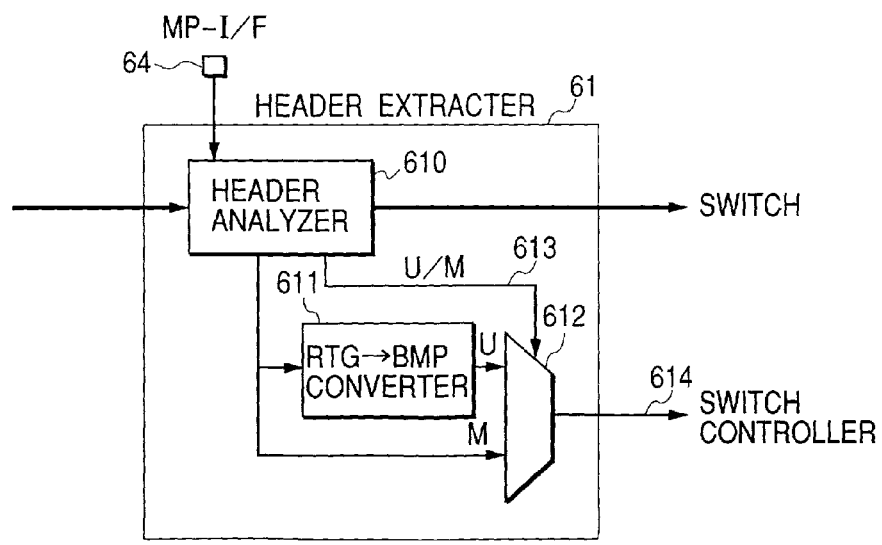
FIG. 12 illustrates effects of internal packet length reduction of the packet switching apparatus of the present invention.
FIG. 13 is a block diagram showing the configuration of a packet switch of the packet switching apparatus of the present invention.

FIG. 13 shows the operation of the header extracter. The internal header 310 extracted in the header extracter 610 is subjected to the identification of multicast or unicast in M/U 311. If the internal header 310 is identified as unicast, conversion from a routing tag to a bitmap is made in RTG-to-BMP converter 611. If the internal header 310 is identified as multicast, a bitmap is outputted without modification. In a subsequent stage, according to a multicast/unicast identifying signal 613, either of the bitmap converted from the routing tag or a bitmap within the internal header 310 added to the original multicast packet is selected by a selector 612. After the selection, output destination information 614 unified to a bitmap format is sent to the switch controller 63, where control of n×n switch 62 is conducted based on the output destination information 614. When, e.g., a bitmap "1001100000000000" is inputted, since the first, fourth, and fifth bits of the bitmap are set to 1, the switch controller 63 controls the switch 62 so that the packet is multicast to output ports #1, #4, and #5. To be more specific, the packet is copied and multicast to output ports #1, #4, and #5. In this embodiment, the length of bitmap of multi-cast packets differs depending on the number of line interface cards installed in the packet switching apparatus. In order that a bitmap area added in the ingress line card 20 can be correctly recognized, information about the length of the bitmap is set to the header analyzer 610 in advance through the MP-I/F 64.

The above embodiment has been described on the assumption that, e.g., 64 line interface cards are installed in slots #1 to #64 in the packet switching apparatus. However, for the reason that slot #2 cannot be used due to fault or other reasons, it is conceivable to use the 64 line interface cards installed in slots #1, and #3 to #65. In this case, it is necessary to change the flow of FIG. 5 or the operation of the switch controller 62. Two change examples are shown below.

CHANGE EXAMPLE 1

In step 401 of FIG. 5, "N" is defined as the number 64 of installed line interface cards plus 1 (that is, a maximum slot number). If no line interface card is installed in slot #2, since no packet is outputted to output port #2, the second bit of bitmap added to multicast packets is always "0" such as "X0XX . . . ."

CHANGE EXAMPLE 2

Without changing the flow of FIG. 5, a 64-bit bitmap is added to multicast packets. From the management terminal 41, information that slot #2 (or line interface #2, or I_PORT#2 and O_PORT#2) is not used is inputted. This information is passed to the switch controller 62 via the controller 40. Upon receiving the information, the switch controller 62 recognizes that the first bit of the bitmap from the start is a bit corresponding to output port #1 as usual, the second bit from the start is a bit corresponding to output port 3, the third bit from the start is a bit corresponding to output port 4, and so forth.

As is apparent from the above description, according to this embodiment, in the case where a large-capacity packet switching apparatus to support multicast over a large number of lines is configured, an area of an internal packet header can be allocated so as to be variable depending on packet types and the number of lines installed. By adding an internal packet header containing only a minimum of information required to each of multicast packets and unicast packets, a packet switching apparatus can be provided which can make effective use of switching resources without having to transfer redundant bits within the apparatus.

Second Embodiment

Figure 14:
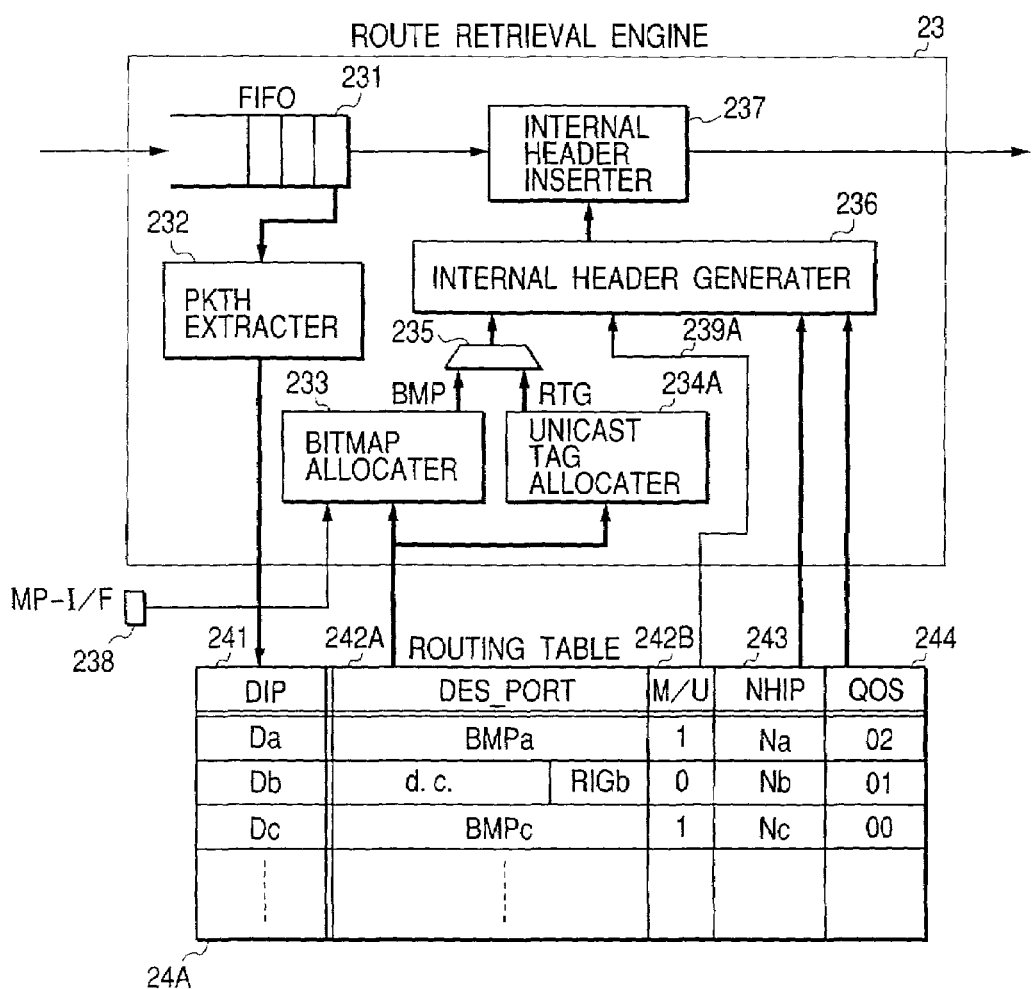
FIG. 14 is a block diagram showing another configuration of the line interface card (ingress side) of the packet switching apparatus of the present invention.

As a second embodiment of the present invention, another embodiment of the route retrieval engine 23 installed in the ingress line card 20 will be described with reference to FIG. 14. Hereinafter, only portions different from the previous description of FIG. 4 will be mainly explained. The route retrieval engine 23 has a unicast allocater 234A instead of the unicast detection and coding 234. A packet inputted to the route retrieval engine 23 is stored in the FIFO queue buffer 231 and successively subjected to the following processing. A packet header (more specifically, referred to as DIP 241 in the case of IP) is extracted from the packet at the head of the FIFO queue buffer 231. DIP 241 is sent to a routing table 24A to retrieve required information. The routing table 24A, for each entry, stores multicast/unicast identifier (M/U) 242B and destination port information 242A in which a routing tag directly indicating a relevant destination is stored for unicast, and bitmap is stored for multicast. The following processing is performed for the destination port information 242A outputted from the destination table 24A. In the case of multicast, in the bitmap allocater 233 just like in FIG. 4, only an area specified by the microprocessor is cut out of bitmap of the destination port information 242. In the case of unicast, only a fixed area is cut out of the destination port information 242A in the unicast allocater 234A. The selector 235 selects signal from the bitmap allocater 233 or the unicast allocater 234A according to an identifying signal 239A generated based on the multicast/unicast identifier (M/U) 242B, and sends the selected one to the internal header generator 236. The identifying signal 239A is also sent to the internal header generator 236. The output signal from the selector 235 is sent to the internal header generator 236 and is inserted in a packet stored in the head of the FIFO queue buffer 231 along with NHIP 243 and QOS information 244 through the internal header inserter 237. Judgment of multicast or unicast can also be made by the type of DIP 241.

In the case where the route retrieval engine is configured as in the present embodiment, since storing processing dedicated to unicast or multicast for the routing table 24A is already performed by software, unicast detection and coding by hardware is unnecessary.

Third Embodiment

Figure 15:
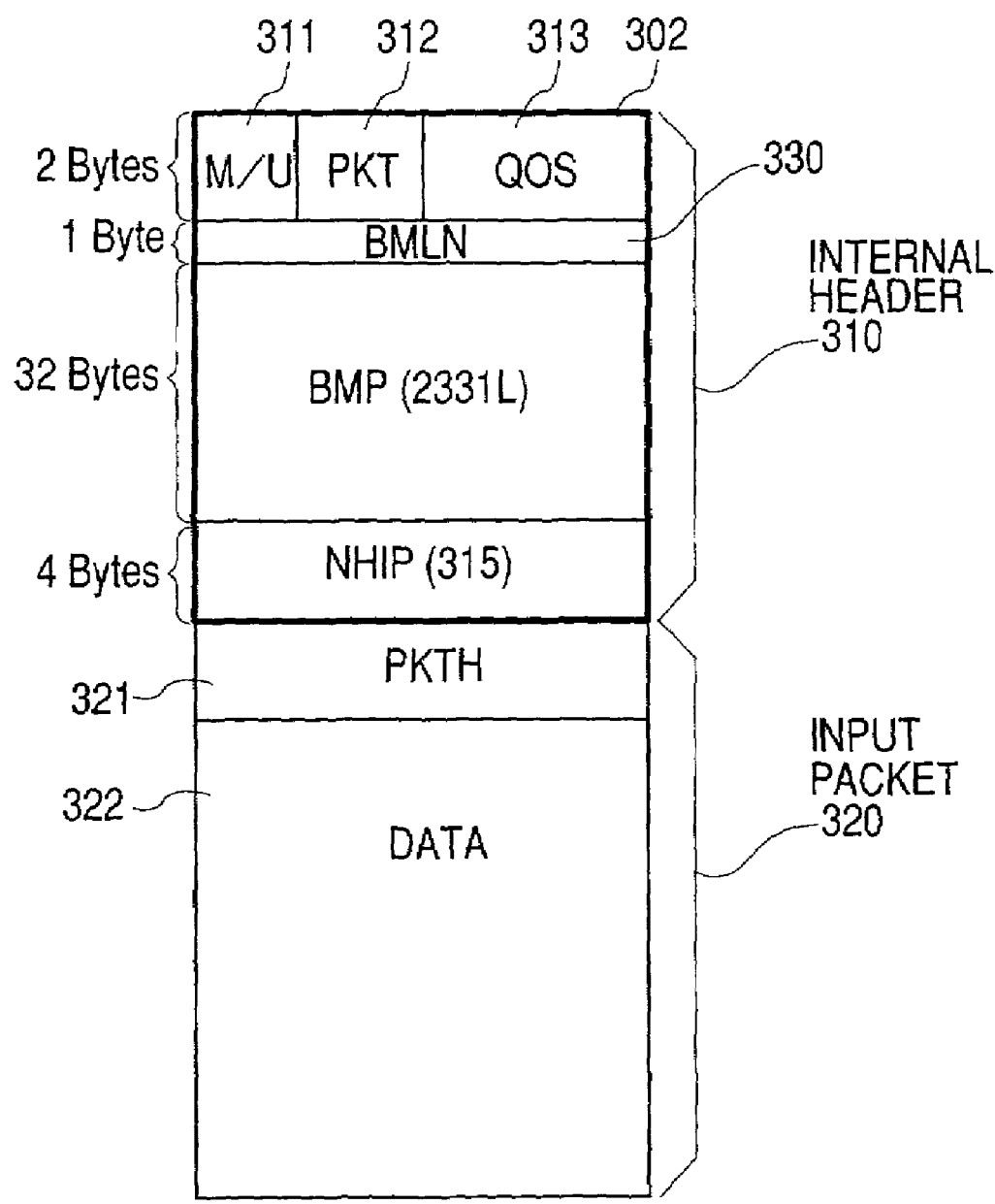
FIG. 15 is an example of a packet format used in the packet switching apparatus of the present invention.

As a third embodiment, another example of a packet format used with the packet switching apparatus of the present invention will be described with reference to FIG. 15. Unicast packets have the same format as described in FIG. 9. The multicast packet 302 consists of an input packet part 320 and an internal header 310. The input packet part 320 consists of a packet header (PKTH) 321 containing a destination IP address and other information, and variable-length data 322. The internal header 310 consists of multicast/unicast identifier (M/U) 311, packet type information (PKT) 312, quality class information (QOS) 313, NHIP 315, and bitmap length information (BMLN) 330. BMLN 330 indicates the number of bytes or bits of a valid bitmap area specified by MP-I/F 238 according to the apparatus scale and the number of installed line interface cards. For multicast packets, by referring to the BMLN 330 area, a valid area of following bitmap (BMP) 2331L can be cut out. By using this packet format, a bitmap area can be correctly selected and cut out without setting information about a bitmap area to be cut out in the header analyzer 610 via MP-I/F 64 in the header extracter 61 within the variable-length packet switch 60. In other words, when the number of line interface cards installed in the switching apparatus is changed, a change of the number of multicast targets, more specifically, a bitmap area can be expanded or shrunk without stopping services.

Fourth Embodiment

Figure 16:
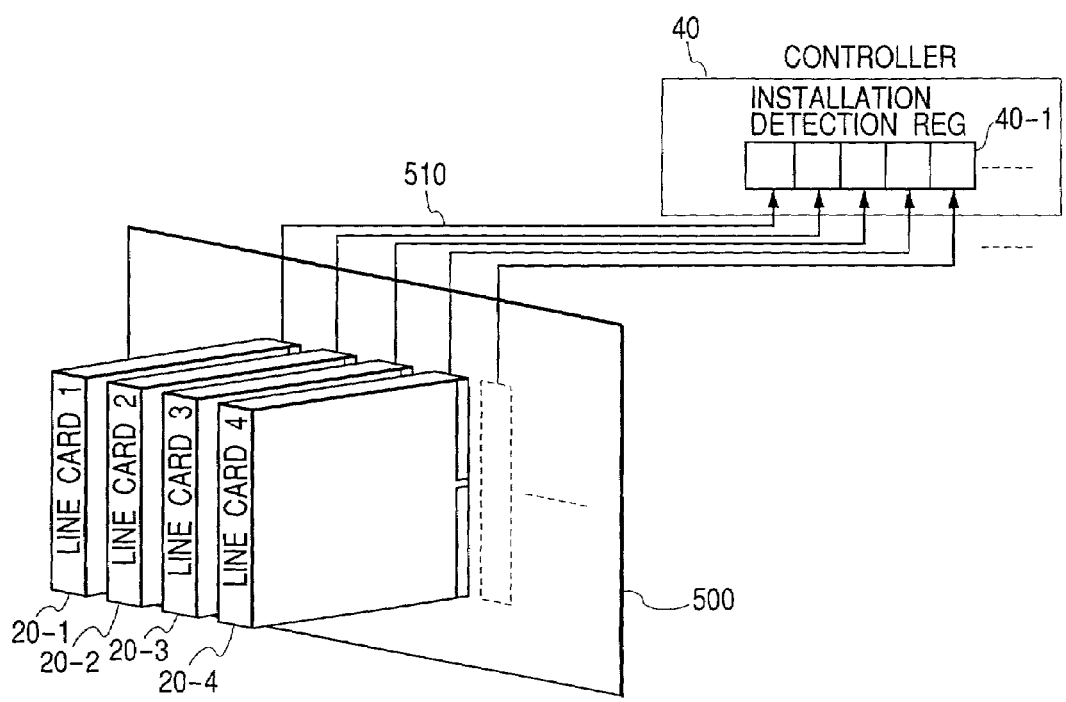
FIG. 16 is a drawing showing physical installation of the line interface card of the packet switching apparatus of the present invention.

A fourth embodiment will be described using FIG. 16. FIG. 16 shows an apparatus configuration in which, upon detecting that line interface cards 20 are installed in a back panel 500, information indicating the status is passed to the controller 40, using a control line 510 provided for each of the line interface cards 20. The controller 40 has an installation register 40 having bits thereof respectively corresponding to the line interface cards. These bits are automatically set by detecting whether the corresponding line interface cards are installed or not. Since use of this configuration tells the number of installed line interface cards through the installation register, bitmap area allocation by the user as describe in FIG. 5 would not be required. To be more specific, since the apparatus automatically detects that a line interface is installed or removed, and can automatically perform a procedure corresponding to that of FIG. 5, that is, area specification to the bitmap allocater 233 and the header analyzer 610, plug & play operation for the line interface cards becomes feasible.

Fifth Embodiment

A fifth embodiment will be described using FIGS. 17 to 20. Although the above description assumes multicast for all line interface cards, multicast service limited to only specific line interface cards is also conceivable.

Figure 17:
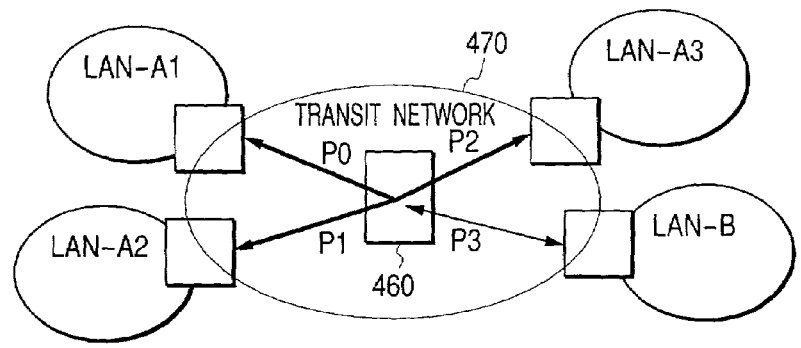
FIG. 17 is a drawing showing an example of application of the packet switching apparatus of the present invention to networks.

In a network drawing shown in FIG. 17, LAN-A1, LAN-A2, LAN-A3, LAN-B, and other LAN not shown are connected to a transit network 410. More specifically, packet data is sent or received between LANs via a packet transit node 460 within the transit network. For example, it is conceivable to form an enterprise network among LAN-A1, LAN-A2, and LAN-A3. A multicast service is supposed to be offered only within the enterprise network. In other words, in the transit node 460, multicast requests occur only among line interface ports P0 to P3 to which LAN-A1 to LAN-A3 are respectively connected, and among other line interface ports, multicast is not performed. In this case, by providing bitmap only for specific line interface cards subject to multicast, the internal header can be further shrunk.

Figure 18:
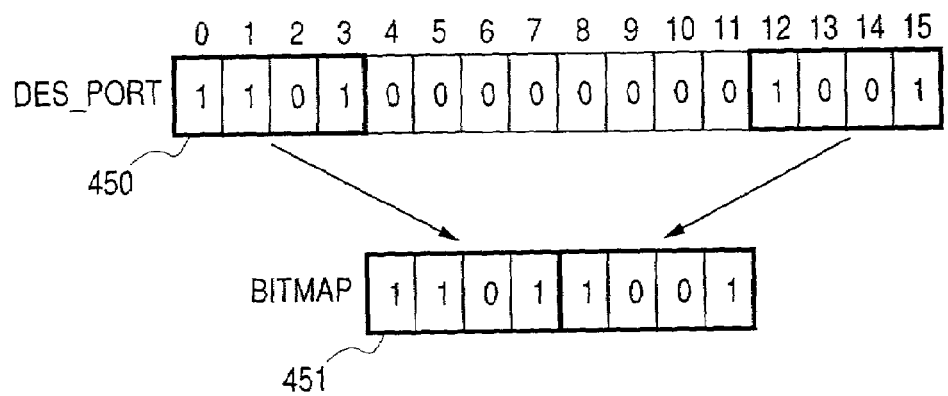
FIG. 18 is an example of bitmap data used in the packet switching apparatus of the present invention.
Figure 19:
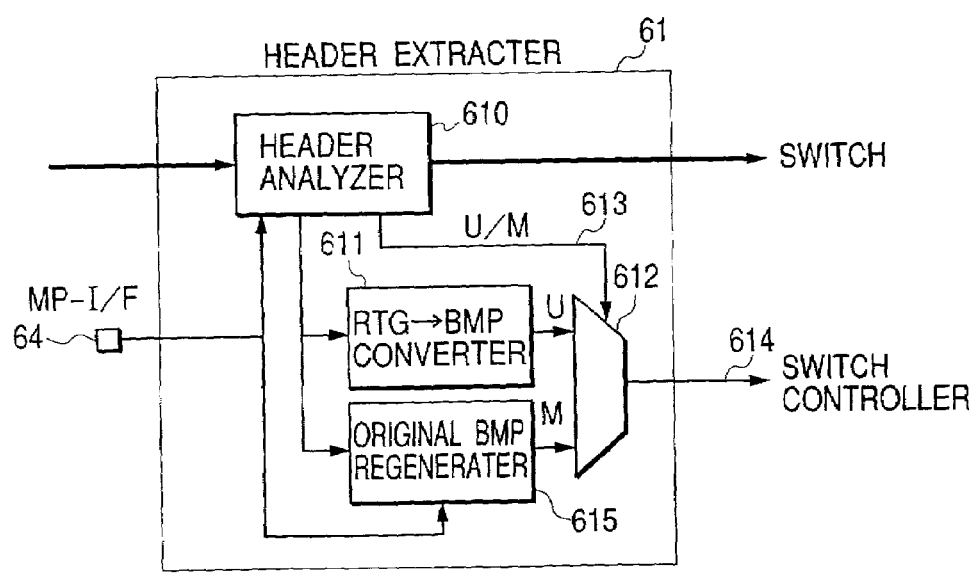
FIG. 19 is a block diagram showing the configuration of a switch of the packet switching apparatus of the present invention.

Reduction of an internal header will be hereinafter described. In FIG. 18, it is assumed that, of line interfaces installed, only line interface numbers 0 to 3 and 12 to 15 are subject to multicast. Specifically, in the DES_PORT (242) area in the routing table 24, only bits corresponding to the line interface numbers 0 to 3 and 12 to 15 may be set to "1" at the same time. In this case, from bitmap 450 arranged in the order of the original line interface card numbers, 8 bits for line interface numbers 0 to 3 and 12 to 15 are cut out and unified as a bitmap (451) and inserted to a multicast packet. The unified bitmap 451 is converted back to the original bitmap 450 in an original BMP regenerater 615 within the variable-length packet switch 60, as shown in FIG. 19.

Figure 20:
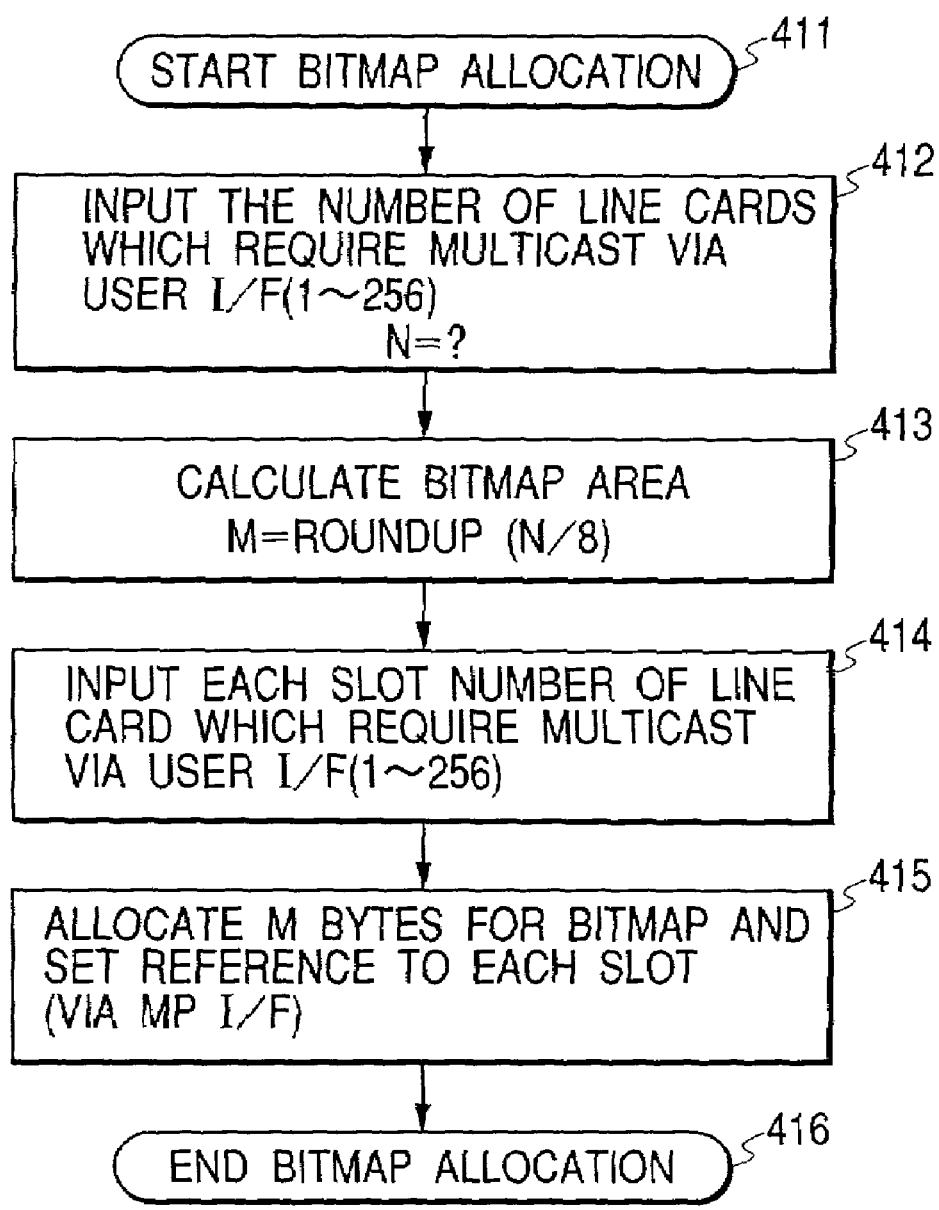
FIG. 20 is a flowchart showing another setup method of the packet switching apparatus of the present invention.
Figure 21:
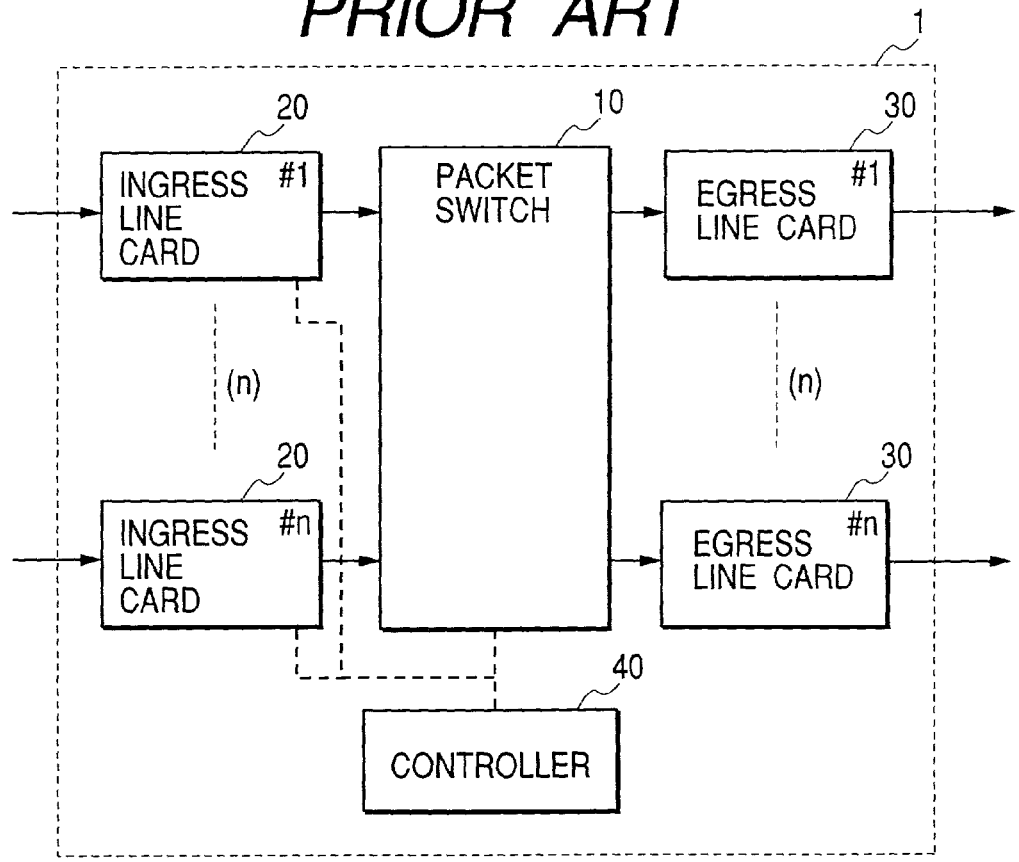
FIG. 21 is a block diagram showing the configuration of a conventional packet switching apparatus.
Figure 22:
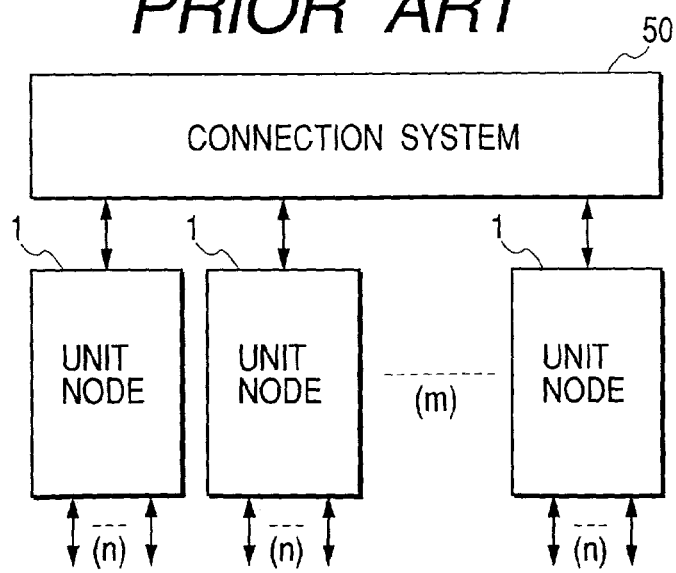
FIG. 22 is a block diagram showing the configuration of a conventional large-capacity packet switching apparatus.
Figure 23:
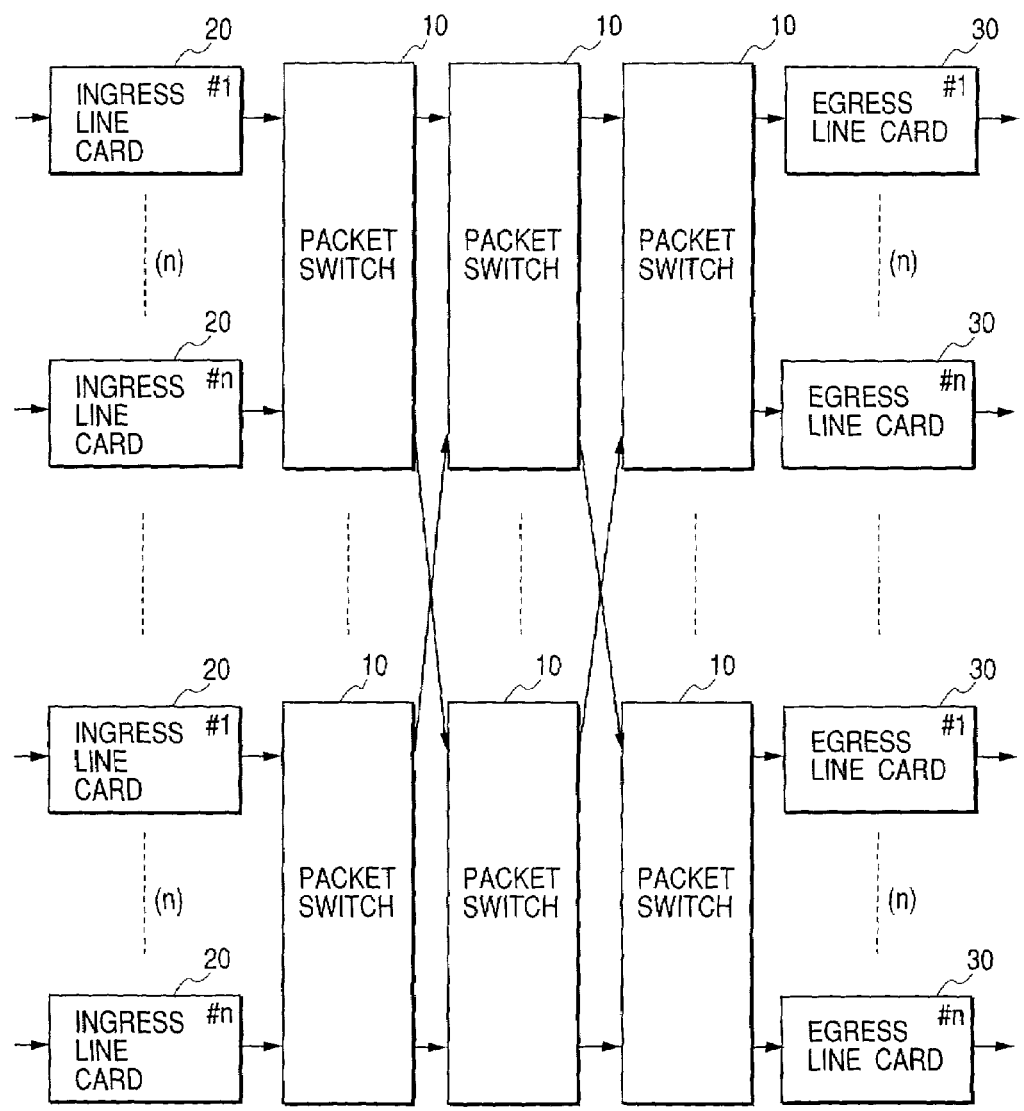
FIG. 23 is a block diagram showing the configuration of a conventional large-capacity packet switching apparatus.
Figure 24:
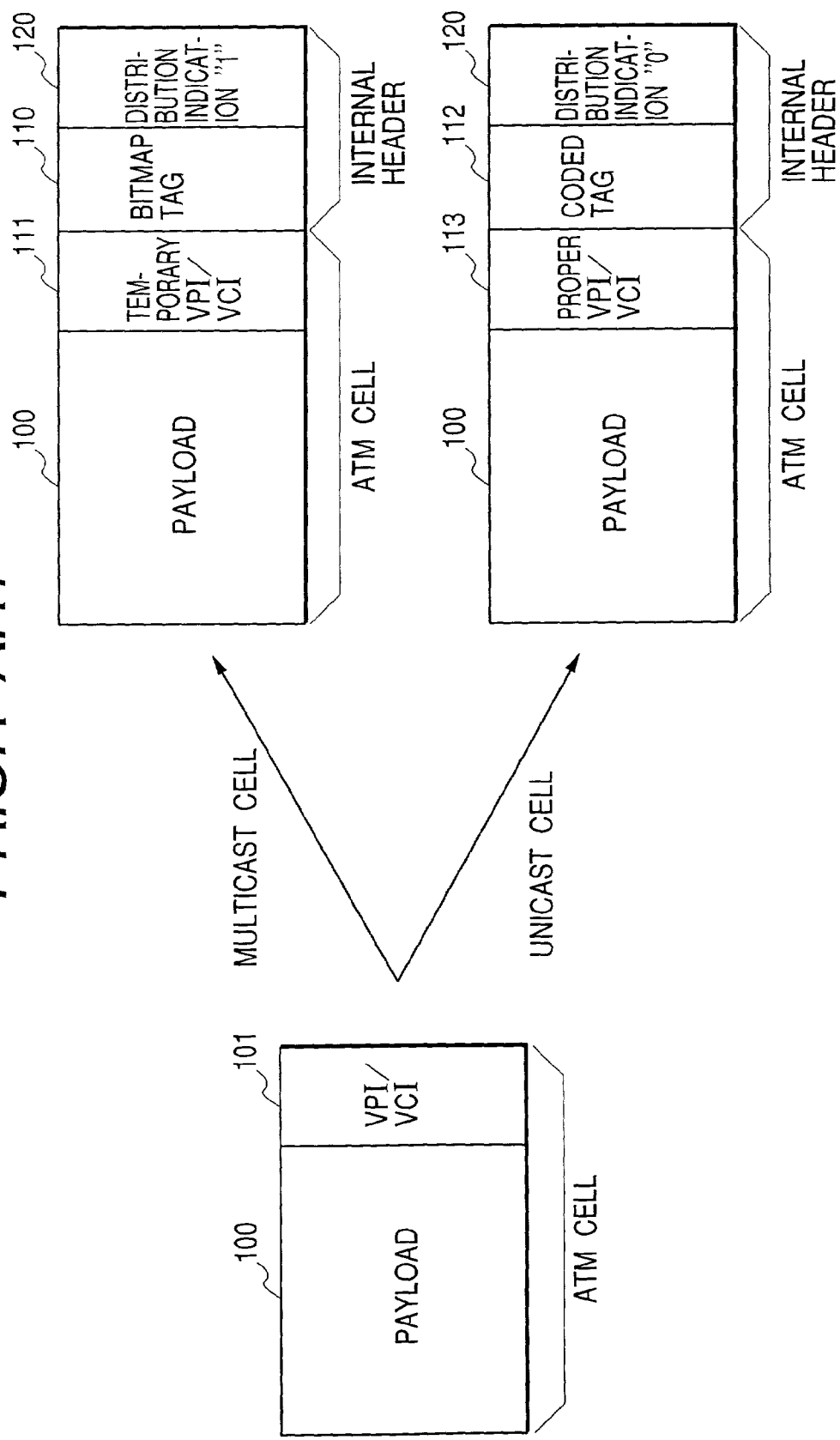
FIG. 24 illustrates a conventional multicast packet method.

FIG. 20 shows an embodiment of the procedure for allocating a bitmap area. The user enters the number of line interface cards subject to multicast from a management terminal connected to the packet switching apparatus (step 411). The entered number of line interface cards subject to multicast is rounded up in units of bytes (step 412). Next, the user successively enters line interface card numbers subject to multicast (step 413). Thereafter, via MP-I/F, a valid bitmap area is allocated for the bitmap allocater 233 and the header extracter 61 within the packet switch 60 (step 414), and thus bitmap allocation terminates. Although, in the example of FIG. 20, the bitmap area is allocated rounded up in units of one byte (8 bits), the bitmap may be allocated in other bit units. A slot number, I_PORT number, or O_PORT number may be entered instead of line interface card numbers.

In this way, by providing bitmap only for specific line interface cards subject to multicast, the internal header area can be further shrunk.

According to the above described embodiments, the following effects are expected.

(1) In the case where a large-capacity packet switching apparatus to support multicast for a large number of lines is configured, an area of an internal packet header can be allocated so as to be variable depending on packet types, and an internal packet header containing only a minimum of information required is added to each of multicast packets and unicast packets. With this configuration, a packet switching apparatus can be provided which can make effective use of switching resources without having to transfer redundant bits within the apparatus.

(2) In a packet switching apparatus that supports multicast for a large number of lines and is scalably expandable, an area of an internal packet header can be allocated so as to be variable depending on the use scale of the switching apparatus, and an internal packet header containing only a minimum of information required is added. With this configuration, a packet switching apparatus can be provided which can make effective use of switching resources without having to transfer redundant bits within the apparatus.

(3) In a packet switching apparatus that supports multicast for a large number of lines and is scalably expandable, an area of an internal packet header can be allocated so as to be variable depending on packet types and the use scale of the switching apparatus, and an internal packet header containing only a minimum of information required is added. With this configuration, a packet switching apparatus can be provided which can make effective use of switching resources without having to transfer redundant bits within the apparatus, and can change the use scale of the switching apparatus without stopping services.

According to the present invention, multicast can be achieved without making a wasteful use of switching resources.

The foregoing invention has been described in terms of preferred embodiments. However, those skilled, in the art will recognize that many variations of such embodiments exist. Such variations are intended to be within the scope of the present invention and the appended claims.

What is claimed is:

1. A packet switching apparatus comprising:
   n (an integer of 3 or more) slots capable of housing line interface cards to each of which an input line and an output line are connected; and
   a packet switch for switching packets outputted from k line interface cards housed in k (an integer equal to or greater than 2 and less than or equal to n) slots of the n slots, wherein:
   each of the k line interface cards adds a bitmap to a multicast packet inputted from the input line and outputs the multicast packet to the packet switch;
   the packet switch multicasts the multicast packets to plural line interface cards of the k line interface cards specified in the bitmap; and
   the length of the bitmap is made variable depending on the value of k, and wherein each of the k line interface cards brings the length of bitmap to n bits when k=n, and makes the length of the bitmap smaller than n bits when k<n.

2. A packet switching apparatus according to claim 1, further comprising:
   a control part for controlling the k line interface cards and the packet switch; and
   a management terminal connected to the control part,
   wherein the value of k is inputted from the management terminal.

3. A packet switching apparatus according to claim 1, further comprising:
   means for detecting that the line interface cards are housed in the slots.

* * * * *